MAGNETIC TAPE APPARATUS WITH HEAD POSITIONING MEANS

Filed June 23, 1965

Inventors
REIN NARMA
DELMAR R. JOHNSON
By Anderson, Luedeka, Fitch, Even & Tabin
Attys.

United States Patent Office 3,401,236

Patented Sept. 10, 1968

3,401,236

MAGNETIC TAPE APPARATUS WITH HEAD POSITIONING MEANS

Rein Narma, Deerfield, and Delmar R. Johnson, Des Plaines, Ill., assignors to Ampex Corporation, Redwood City, Calif., a corporation of California Filed June 23, 1965, Ser. No. 466,197

10 Claims. (Cl. 179—100.2)

This invention relates to magnetic tape recording and reproducing apparatus, and more particularly, to an improved magnetic transducing head and rotatable drum assembly for use in such recording and reproducing apparatus.

The control of head-to-tape contact in magnetic tape recording and reproducing apparatus is extremely important, especially for recording and reproducing high frequency signals, such as video signals. Poor or erratic contact caused by worn head tip surface may result in loss, drop-out or distortion of signals to be recorded or reproduced. On the other hand, proper contact between the head tip and the tape provides for favorable recording and reproduction of signal information, in addition to providing for improved head wear characteristics. Proper head tip contact with the tape also provides a "tenting effect" on each sweep of the tape. This helps to maintain a cushion of air between the tape and the drum around which the tape passes, to air lubricate the tape and facilitate its passage about the drum with a minimum of friction.

Over a period of time, the head tip or transducing portion may become worn such that faithful recording and reproduction of signal information, and proper air lubrication, is no longer possible. Under such circumstances, it is necessary either to replace the head with a new one of proper dimensions, or to adjust the position of the head with respect to the drum over which the tape passes in order to reestablish the proper head-to-tape contact. The former solution is, of course, relatively expensive and the latter solution may involve extremely complicated apparatus for its accomplishment. This is because the head must be adjusted such that the tip does not project so far as to cause excessive tape wear, and such that the tip is properly positioned with respect to the tape passing over the drum for minimum distortion and good air lubrication. It is advantageous that this adjustment be easily made. It is also advantageous that the head be susceptible of installation and removal without having to disassemble the drum.

It is an object of this invention to provide an improved magnetic transducing head and rotatable drum assembly for use in magnetic tape recording and reproducing apparatus.

Another object of the invention is to provide a magnetic transducing head and rotatable drum assembly wherein the head is easily adjustable with respect to the drum.

Still another object of the invention is to provide an adjustable magnetic transducing head and rotatable drum assembly which is low in cost and simple of construction.

A further object of the invention is to provide a magnetic transducing head and drum assembly wherein the head may be readily removed from the drum.

The magnetic transducing head and rotatable drum assembly of the invention may be incorporated in a two drum scanning assembly for magnetic tape recording and reproducing apparatus. A rotatable drum rotates with respect to a second drum of the same diameter which is mounted coaxial therewith. The rotatable drum has a central hub portion, a cylindrical wall portion, and a connecting portion. The magnetic transducing head is mounted on the rotatable drum for rotation therewith and has a tape contacting tip extending outwardly of the wall portion of the drum, for example, through an aperture therein. The drum is provided with locating means having first and second mutually transverse reference surfaces. The head is provided with third and fourth mutually transverse reference surfaces adapted to mate respectively with the first and second reference surfaces on the locating means to locate the head with respect to the drum. The first and second reference surfaces are disposed to permit movement of the head radially with respect to the drum. A spring or plurality of springs engages the head and biases the third reference surface against the first reference surface and further operates to bias the head such that the tip thereof is urged outwardly of the drum. Means are provided for locking the head with respect to the drum by locking the fourth reference surface against the second reference surface with the tip projecting outwardly of the drum a predetermined distance. Such means may comprise a screw extending through the locating means and the head into a clamping or holding plate. The distance of tip projection may be determined by a gauge held against the external surface of the wall portion of the drum. The locating means is removable from the drum without the necessity for taking apart the scanning assembly.

Figures 1, 2, 3, 4:
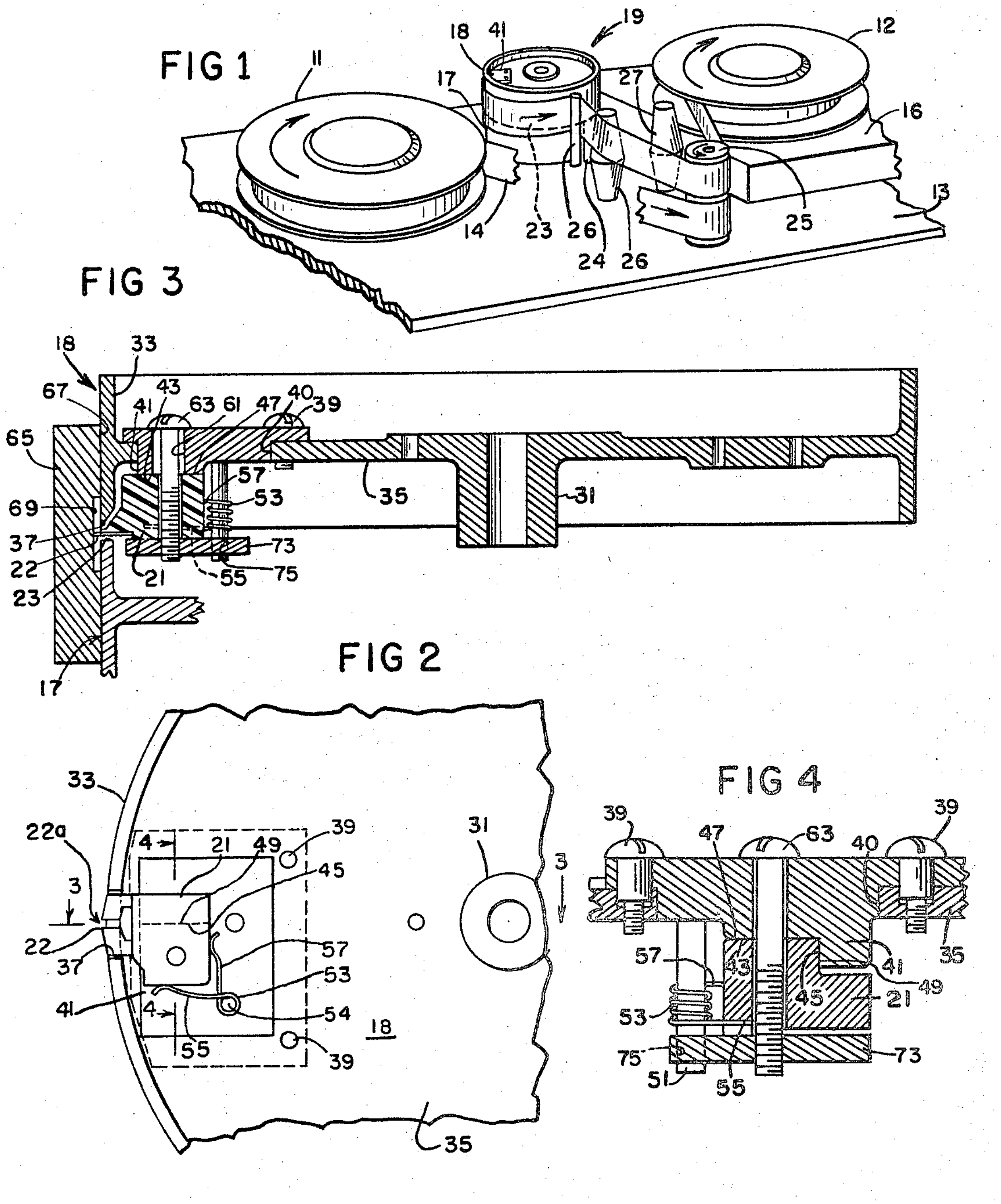
FIGURE 1 is a perspective view of magnetic tape recording and reproducing apparatus incorporating the invention.
FIGURE 2 is a bottom plan view of a magnetic transducing head and rotatable drum assembly constructed in accordance with the invention but with the holding plate removed.
FIGURE 3 is a full section view taken along the line 3—3 of FIGURE 2 and showing a portion of the second drum in section; and, FIGURE 4 is an enlarged sectional view taken along the line 4—4 of FIGURE 2.

Referring now more particularly to FIGURE 1, a tape transport for magnetic tape recording and reproducing apparatus is illustrated. The tape transport illustrated herein is not necessarily the only type of transport which could incorporate the invention, and is shown for the purposes of illustration only. The tape transport includes supply and takeup reels 11 and 12 mounted for rotation upon a panel or deck 13 at spaced positions thereon, and which serve to store the magnetic tape 14. The supply reel 11 is mounted upon the deck surface proper, while the takeup reel 12 is mounted upon a raised support portion 16, so as to be elevated with respect to the supply reel for purposes subsequently described. The supply and takeup reels may be coupled to electric drive motors (not shown) in a conventional manner. The motors are arranged to maintain tape tension and to wind up the tape on the takeup reel during normal operation. The length of tape 14 extending between the reels 11 and 12 is wrapped helically about coaxial and closely spaced drums 17 and 18, which comprise a scanning assembly 19. The upper drum 18 rotates with respect to the lower drum 17 and carries a magnetic transducing head 21 (see FIGS. 2–4) having a tip 22 which extends outwardly of drum 18 at the gap 23 between drums 17 and 18.

In order to facilitate driving and guidance of the tape helically about the scanning assembly drums 17 and 18, a rotatable capstan 25 is mounted upon the deck 13 in forwardly spaced parallel relation to the scanning assembly 19. Uniformly cylindrical entrance and exit guide posts 24 and 26 are mounted upon the deck close to the periphery of drums 17 and 18, and on opposite sides of a line between the drum and capstan axes. The posts are parallel to the axis of the drums. In addition, a pair of spindles 27 and 28 are mounted upon the deck on opposite sides of the line between the capstan and drum axes at points between the capstan and the posts. The tape leaving the supply reel extends around the lower portion of the capstan 25, about the downwardly tapered lower half of spindle 27, through the gap between posts 24 and 26, around the entrance post 24 and tangentially upon the lower cylindrical drum 17 of the scanning assembly 19.

By virtue of the shape of spindle 27, the tape is twisted slightly to slant the lower edge thereof inwardly toward the line between the capstan and drum axes. This twist causes the tape entering the scanning assembly to traverse an upward path as it extends substantially 360° around the drums 17 and 18 to the exit post 26. The tape thus extends about the scanning assembly in a helical wrap. The taper of the spindle 27 is selected, moreover, to impart a pitch to the helical wrap which positions substantially the entire width of the tape over the upper drum 18 at a point adjacent the exit post 26. The tape then tangentially leaves the upper drum to extend around the exit post 26 and through the gap between the posts 26 and 24.

The departing tape extends around the upwardly tapered upper half of the spindle 28 and around the upper portion of the capstan 25 onto the takeup reel 12. A twist is applied to the tape as it extends about the upper half of spindle 28. The taper of the upper half of this spindle is equal but opposite to that of the lower half of the spindle 27 such that the tape is twisted to slant the lower edge thereof outwardly from a line between the drum and capstan axes by an amount equal to the inward slant of the lower edge arising from the original twist effecting the helical wrap. Thus the departing tape is returned to a path lying in a plane parallel with the deck 13 before it reaches the capstan such that the tape extends uniformly thereabout and is directed uniformly tangentially upon the takeup reel without kinking or twisting. As previously noted, by virtue of the helical wrap, the tape rises in passing around the drums and it is for this reason that the takeup reel is mounted in elevated position upon raised portion 16.

Although the guidance arrangement of the tape transport illustrated in the drawings and herein described is such as to provide an "Omega" helical wrap about the scanning assembly 19, it is to be noted that this specific form of wrap is purely exemplary and that other helical waps extending exactly 360° or substantially less than 360° may as well be employed with the invention by appropriate modification of the tape guidance system. A 180° wrap may, for example, be employed with two heads mounted at diametrically opposed points of a head drum to facilitate recording and playback of tracks containing complete fields of a television signal, as opposed to complete frames recorded and reproduced by a single head scanning the tape in a substantially 360° wrap.

Referring now more particularly to FIGURES 2 through 4, the details of the assembly of the invention may be more clearly seen. Drum 18 is comprised of a hub portion 31, a cylindrical wall portion 33, and a connecting web portion 35. The magnetic transducing head 21 is secured to the underside of web portion 35 and has a tip 22, which may be of a type well known in the art, protruding through an aperture 37 in the wall portion 33 of drum 18. Tip 22 forms part of a magnetic circuit and has a narrow air gap 22*a* therein. During recording, the portion of magnetic tape extending across gap 22*a* is magnetized in accordance with electrical signals applied to head 21. During reproducing or playback, the head 21 produces electrical signals in accordance with changing flux in the magnetic circuit, of which tip 22 is a part, caused by magnetized portions of the tape passing over gap 22*a*. It is important that gap 22*a* be properly positioned with respect to the tape for low distortion and tape wear. As the drum 18 is rotated with respect to the lower drum 17 a very high speed (for example, 3600 r.p.m.) head tip 22 will engage and sweep across the tape 14 very frequently (for example, 60 times per second). Since the rapidly rotating head will force the tape 14 outwardly of the outer drum surface in a sort of tent shape each time the head traverses the tape, tenting effect caused by rapid rotation of the head coupled with the stream of air being drawn into the region between tape 14 and the surface of drum 18 due to the rotation of drum 18 will cause a film of air to be distributed between the tape and the drum. This maintains the tape at a certain distance from both of the drums to air lubricate the tape such that the tape may easily move around the drums with almost no friction losses.

In order to maintain the proper head-to-tape contact for producing the desired air lubrication and for desirable recording and reproduction, it is necessary that the distance which the head tip 22 protrudes from the aligned outer surfaces of drums 17 and 18 be adjusted accurately (to, for example, .005 inch). After a certain period of use, however, the tip 22 of head 21 may wear sufficiently that this projection distance is no longer maintained. It would be possible, of course, to reattain the desired projection distance by replacing the head with a new one. This, however, may involve considerable expense.

In accordance with the invention, the head 21 is made adjustable with respect to the drum 18 in a unique and simple manner which provides exact location and positioning of the head with respect to the drum. Such location and positioning is very important from the standpoint of tape wear and low distortion because of the fact that air gap 22*a* must be properly positioned with respect to the tape. The web portion 35 is provided with an opening 40 therein. A locating member 41 is secured in a predetermined position to the top of web portion 35 by shoulder screws 39. Locating member 41 projects through opening 40 and the portion of locating member 41 which is below web portion 35 has a reference or locating surface 43 which is machined therein to lie in a plane substantially perpendicular to the axis of drum rotation. A further reference or locating surface 45 is machined in locating member 41 to be substantially coplanar with the axis of drum rotation or parallel to a plane which includes the axis of drum rotation and perpendicular to surface 43. Head 21 is provided with a pair of mutually perpendicular reference or locating surfaces 47 and 49 which are adapted to mate, respectively, with surfaces 43 and 45. The surfaces thus locate and position the head 22 with respect to the drum 18 with the point of maximum projection lying along a radius of the drum. This insures that the tape will contact the tip with substantially the same pressure on both sides of gap 22*a* for even wear and low signal distortion.

The various pairs of reference surfaces need not be mutually perpendicular but, for best results, surfaces 43 and 45 should intersect in a line parallel to a radius of the drum which extends through the gap 22*a* in tip 22. Such a line could also include a radius of the drum through the gap 22*a* of tip 22 and it is to be understood that such a line is included in the term "a line parallel to a radius of the drum through tip 22." It is necessary that the line of intersection of the surfaces 43 and 45 or the continuation of the surfaces (the surfaces need not actually intersect) have a substantial radial component of direction to permit the head 21 to move radially with respect to drum 18. Surfaces 47 and 49 should mate with surfaces 43 and 45 in all cases.

A post 51 extends downwardly from the web portion 35. A torsion spring 53 is mounted on and surrounds post 51. Spring 53 has a pair of resilient arms 55 and 57 extending therefrom at an approximate right angle with respect to each other. Resilient arm 55 engages head 21 and biases the surface 49 of head 21 against the surface 45 for accurately locating the head along a radial line from the axis of drum 18. This serves to center the tip 22 of head 21 along a radius of the drum 18. Resilient arm 57 engages the head to urge the tip thereof radially outward of the drum 18 through the opening 37. An elongated opening 61 is provided in member 41 and a locking screw 63 extends downwardly through opening 61 and through a hole 71 in head 21 into threaded engagement with a holding plate 73. Holding plate 73 has a hole 75 therein near one corner and post 51 extends into this hole to prevent plate 73 from twisting when screw 63 is tightened. The head of screw 63 is located on the upper side of locating member 41 for convenient access, and screw 63 is free to move in opening 61 to permit radial movement of head 21 with respect to drum 18. As an alternative, another type of spring or springs might be utilized to perform the function of spring 53.

When it is desired to reset the head 21 with respect to the drum 18, the hold down or locking screw 63 is loosened. Resilient arm 57 will move the head outwardly from the center of the drum and resilient arm 55 will, at the same time, keep the head located against reference surface 45. A suitable gauge 65 (see FIG. 2) having a surface 67 for engaging the outer surface of drums 17 and 18 and a locating or reference surface 69 disposed a distance from surface 67 corresponding to the desired projection of tip 22, may be provided. Gauge 65 is held vertically against drums 17 and 18 and the tip 22 of head 21 engages surface 69 to properly locate the head radially with respect to drum 18. Locking screw 63 is then tightened to lock surfaces 43 and 49 firmly against each other by sandwiching the head between locating member 41 and holding plate 73. Thus, the reference surfaces serve to properly locate and position head 21 in the axial and circumferential dimensions simultaneously, while the radial dimension is easily located by a simple gauge template.

It may therefore be seen that the invention provides an improved magnetic transducing head and rotatable drum assembly for use in magnetic tape recording and reproducing apparatus. The assembly is simple of construction and makes possible easy adjustment of the head with respect to the drum even though the head is not readily accessible because it is located under the connecting web of the drum. Accurate positioning of the head with respect to the drum is maintained in order to insure proper location and positioning of the head tip with respect to the tape passing over the drum. Since this latter fact is particularly important from the standpoint of low tape wear and low distortion and proper air lubrication, the fact that it is simply and easily accomplished affords a significant improvement in the magnetic tape and reproducing art. When it becomes necessary to replace the head, the drum 18 need not be removed from the scanning assembly 19. It is only necessary to remove screws 39 and then lift locating member 41 out of opening 40. The head may then be easily replaced and the locating member 41 remounted as before on drum 18.

Embodiments in accordance with the invention other than those specifically shown will be apparent to those skilled in the art from the foregoing description and attached drawings, and such embodiments are intended to fall within the scope of the appendant claims.

What is claimed is:

1. A magnetic transducing head and rotatable drum assembly for use in magnetic tape recording and reproducing apparatus, including in combination, a rotatable drum having a hub portion and a cylindrical wall portion and a connecting portion, locating means on said drum providing first and second mutually transverse reference surfaces, a magnetic transducing head having a tape engaging tip protruding externally of said wall portion of said drum, said head further having third and fourth mutually transverse reference surfaces adapted to mate respectively with said first and second reference surfaces on said locating means and position said head with respect to said drum, said first and second reference surfaces being disposed to permit movement of said head radially with respect to said drum, resilient means engaging said head and biasing said third reference surface against said first reference surface and urging said tip outwardly of said wall portion of said drum, and locking means operable to secure said head with respect to said drum by locking said fourth reference surface against said second reference surface with said tip projecting outwardly of said wall portion a predetermined distance.

2. A magnetic transducing head and rotatable drum assembly for use in magnetic tape recording and reproducing apparatus, including in combination, a rotatable drum having a hub portion and a cylindrical wall portion and a connecting portion, locating means on said drum providing first and second mutually transverse reference surfaces, a magnetic transducing head having a tape engaging tip protruding externally of said wall portion of said drum, said head further having third and fourth mutually transverse reference surfaces adapted to mate respectively with said first and second reference surfaces on said locating means and locate said head with respect to said drum, said first and second reference surfaces having a line of intersection which has a substantial radial component of direction with respect to said drum, resilient means engaging said head and biasing said third reference surface against said first reference surface and urging said tip outwardly of said wall portion of said drum, and locking means operable to secure said head with respect to said drum by locking said fourth reference surface against said second reference surface with said tip projecting outwardly of said wall portion a predetermined distance.

3. A magnetic transducing head and rotatable drum assembly for use in magnetic tape recording and reproducing apparatus, including in combination, a rotatable drum having a hub portion and a cylindrical wall portion and a connecting portion, said wall portion having an aperture therein, locating means on said drum providing first and second mutually perpendicular reference surfaces, a magnetic pickup head having a tip and third and fourth mutually perpendicular reference surfaces adapted to mate respectively with said first and second reference surfaces on said locating means and locate said head with respect to said drum, said first and second reference surfaces having a line of intersection which is disposed in a direction substantially parallel to a radius of said drum through said tip, a post extending from said connecting portion, a torsion spring mounted on said post and having first and second resilient arms, said first resilient arm engaging said head and biasing said third reference surface against said first reference surface, said second resilient arm engaging said head to urge said tip thereof outwardly of said drum through said aperture in said wall portion, and locking means operable to secure said head with respect to said drum by locking said fourth reference surface against said second reference surface with said tip projecting outwardly of said wall portion a predetermined distance.

4. A magnetic transducing head and rotatable drum assembly for use in magnetic tape recording and reproducing apparatus, including in combination, a rotatable drum having a hub portion and a cylindrical wall portion and a connecting portion, locating means on said drum providing first and second mutually transverse reference surfaces, a magnetic transducing head having a tape engaging tip protruding externally of said wall portion of said drum, said head further having third and fourth mutually transverse reference surfaces adapted to mate respectively with said first and second reference surfaces on said locating means for locating and positioning said head with respect to said drum, said first and second reference surfaces having a line of intersection which is substantially parallel to a radius of said drum through said tip, resilient means engaging said head and biasing said third reference surface against said first reference surface and urging said tip outwardly of said wall portion of said drum, and locking means operable to secure said head with respect to said drum by locking said fourth reference surface against said second reference surface with said tip projecting outwardly of said wall portion a predetermined distance.

5. A magnetic transducing head and rotatable drum assembly for use in magnetic tape recording and reproducing apparatus, including in combination, a rotatable drum having a hub portion and a cylindrical wall portion and a connecting portion, said wall portion having an aperture therein, said connecting portion having a locating member thereon having a first reference surface substantially perpendicular to the axis of rotation of said drum and a second reference surface in a plane including a line substantially parallel with the axis of rotation of said drum, a magnetic transducing head having a tip and third and fourth mutually perpendicular reference surfaces adapted to mate respectively with said first and second reference surfaces and locate and position said head with respect to said drum, resilient means engaging said head and biasing said third reference surface against said first reference surface, said resilient means further engaging said head to urge said tip thereof radially outward of said drum through said aperture in said wall portion, and a locking screw for securing head with respect to said drum by locking said fourth reference surface against said second reference surface with said tip projecting outwardly of said wall portion a predetermined distance.

6. A magnetic transducing head and rotatable drum assembly for use in magnetic tape recording and reproducing apparatus, including in combination, a rotatable drum having a hub portion and a cylindrical wall portion and a connecting web portion, said wall portion having an aperture therein, said web portion having a locating member thereon having a first reference surface substantially perpendicular to the axis of rotation of said drum and a second reference surface substantially coplanar with the axis of rotation of said drum, a magnetic transducing head having a tip and third and fourth mutually perpendicular reference surfaces adapted to mate respectively with said first and second reference surfaces and locate and position said head with respect to said drum, a post extending from said web portion, a torsion spring mounted on said post and having first and second resilient arms, said first resilient arm engaging said head and biasing said third reference surface against said first reference surfaces, said second resilient arm engaging said head to urge said tip thereof radially outward of said drum through said aperture in said wall portion, and a locking screw for securing said head with respect to said drum by locking said fourth reference surface against said second reference surface with said tip projecting outwardly of said wall portion a predetermined distance.

7. The combination of claim 6 wherein the axis of drum rotation is substantially vertical, and wherein said head and said post are located on the underside of said web portion, and wherein the head of said screw is located on the top of said web portion.

8. A magnetic transducing head and rotatable drum assembly for use in magnetic tape recording and reproducing apparatus, including in combination, a rotatable drum having a hub portion and a cylindrical wall portion and a connecting portion, said connecting portion having a locating member thereon having first and second mutually transverse reference surfaces, a magnetic transducing head having a tip and third and fourth mutually transverse reference surfaces adapted to mate, respectively, with said first and second reference surfaces and locate and position said head with respect to said drum, resilient means engaging said head and biasing said third reference surface against said first reference surface and urging said tip outwardly of said drum, with said tip projecting outwardly of said wall portion a predetermined distance, a first opening in said connecting portion and a second opening in said head, a locking screw extending through said first and second openings, and a holding plate threadedly engaged with said screw on the opposite side of said head from said connecting portion, said screw clamping said head between said holding plate and said connecting portion and locking said fourth reference surface against said second reference surface.

9. A magnetic transducing head and rotatable drum assembly for use in magnetic tape recording and reproducing apparatus, including in combination, a rotatable drum having a hub portion and a cylindrical wall portion and a connecting portion, said connecting portion having a locating member thereon having a first and second mutually transverse reference surfaces thereon, a magnetic transducing head having a tip and third and fourth mutually transverse reference surfaces adapted to mate, respectively, with said first and second reference surfaces and locate and position said head with respect to said drum, a post extending from said locating member, a torsion spring mounted on said post and having first and second resilient arms, said first resilient arm engaging said head and biasing said third reference surface against said first reference surface, said second resilient arm engaging said head to urge said tip thereof outwardly of said drum, said locating member having a first opening therein, said head having a second opening therein, a locking screw extending through said first and second openings, and a holding plate threadedly engaged with said locking screw for clamping said head against said locating member by locking said fourth reference surface against said second reference surface with said tip projecting outwardly of said wall portion a predetermined distance, said holding plate having a third opening therein mating with said post to secure said holding plate against twisting when said locking screw is tightened.

10. A magnetic transducing head and rotatable drum assembly for use in magnetic tape recording and reproducing apparatus, including in combination, a rotatable drum having a hub portion and a cylindrical wall portion and a connecting web portion, said drum having an axis of rotation which is substantially vertical, said web portion having an opening therein, a locating member removably attached to the top of said web portion and having a locating portion extending through said opening in said web portion to project below said web portion, said locating portion of said locating member having first and second mutually transverse reference surfaces, a magnetic transducing head having a tape engaging tip protruding externally of said wall portion of said drum, said head further having third and fourth mutually transverse reference surfaces adapted to mate, respectively, with said first and second reference surfaces on said locating portion and position said head with respect to said drum, said first and second reference surfaces being disposed to permit movement of said head radially with respect to said drum, resilient means secured to said locating member and engaging said head, said resilient means biasing said third reference surface against said first reference surface and urging said tip outwardly of said wall portion of said drum, and locking means mounted on said locating member and operable to secure said head with respect to said drum by locking said fourth reference surface against said second reference surface with said tip projecting outwardly of said wall portion a predetermined distance, said opening in said web portion being of a size sufficient to permit passage of said locating portion and said head therethrough after detaching said locating member from said web portion.

References Cited

UNITED STATES PATENTS 3,076,060 1/1963 Horstkorta -------- 179—100.2

BERNARD KONICK, *Primary Examiner.*

J. R. GOUDEAU, *Assistant Examiner.*